(12) United States Patent
Aydar et al.

(10) Patent No.: US 7,677,637 B2
(45) Date of Patent: Mar. 16, 2010

(54) PROTECTIVE COVER FOR MOTOR VEHICLES

(75) Inventors: Nalan Aydar, Schönaich (DE); Uwe Lehrmann, Bokensdorf (DE)

(73) Assignee: Volkswagen AG, Wolfsburg (DE)

( * ) Notice: Subject to any disclaimer, the term of this patent is extended or adjusted under 35 U.S.C. 154(b) by 50 days.

(21) Appl. No.: 11/630,924

(22) PCT Filed: Jun. 10, 2005

(86) PCT No.: PCT/EP2005/006234

§ 371 (c)(1),
(2), (4) Date: Aug. 30, 2007

(87) PCT Pub. No.: WO2006/000302

PCT Pub. Date: Jan. 5, 2006

(65) Prior Publication Data

US 2008/0129078 A1     Jun. 5, 2008

(30) Foreign Application Priority Data

Jun. 24, 2004 (DE) .................. 20 2004 009 967 U

(51) Int. Cl.
*B60J 7/20* (2006.01)
(52) U.S. Cl. .................. 296/136.07; 296/136.01; 296/136.1
(58) Field of Classification Search ............ 296/136.01, 296/136.07, 136.08, 136.1
See application file for complete search history.

(56) References Cited

U.S. PATENT DOCUMENTS 4,635,996 A    1/1987    Hirose
5,209,545 A *    5/1993    Slaugh .................. 296/136.07

FOREIGN PATENT DOCUMENTS

| DE | 20 2004 010 996 | 10/2004 |
|---|---|---|
| DE | 20 2004 010 997 | 10/2004 |
| DE | 203 19 938 | 5/2005 |
| DE | 203 19 939 | 5/2005 |
| DE | 20 2005 005 785 | 8/2006 |
| EP | 1 061 008 | 12/2000 |
| EP | 1 712 393 | 10/2006 |
| JP | 1-314676 | 12/1989 |
| JP | 2-57446 | 2/1990 |
| WO | WO 2007/124935 | 11/2007 |

OTHER PUBLICATIONS

Patent Abstracts of Japan, vol. 014, No. 228 (M-0973), May 15, 1990.
Patent Abstract of Japan, vol. 014, No. 113 (M-0944), Mar. 2, 1990.
International Search Report, PCT International Patent Application No. PCT/EP2005/006234, dated Oct. 5, 2005.
Written Opinion of the International Searching Authority, PCT International Patent Application No. PCT/EP2005/006234, dated Oct. 5, 2005 (English-language translation provided).

* cited by examiner

*Primary Examiner*—Lori L Lyjak
(74) *Attorney, Agent, or Firm*—Kenyon & Kenyon LLP

(57) ABSTRACT

A protective cover for motor vehicle, motor vehicle components, machines, etc., includes a cover protecting the principal part of the object, and at least one protective covering for at least one component movably affixed on the object. The protective covering for the movable component is a protective covering that is separate from the cover for the principal part of the object.

45 Claims, 2 Drawing Sheets

PROTECTIVE COVER FOR MOTOR VEHICLES

FIELD OF THE INVENTION

The present invention relates to a protective cover for motor vehicles, motor vehicle components, machines, etc., and includes a cover protecting the principal part of the object, and at least one protective covering for at least one component movably affixed on the object.

BACKGROUND INFORMATION

Such protective covers for motor vehicles, machinery, etc., are provided, in particular, for preventive protection of the surface, both from abrasive or chemical emissions such as dust, flash rust, bird droppings, condensate, moisture build-up and penetrating moisture, as well as from mechanical damage such as scratch and abrasion damage and damage resulting therefrom during periods of downtime, storage and transportation.

European Published Patent Application No. 1 061 008 describes a protective cover for a motor vehicle made up of a multitude of foil segments whose edges are joined to one another along predefined edge lengths, the connected edges forming differently shaped boundaries of the associated foil segments, so that the protective cover is formed such that it corresponds to a surface in space that conforms to the surface of the body of the motor vehicle. This protective cover also includes foil segments that cover mobile add-on parts of the vehicle body, which are referred to as flap segments. These flap segments are joined in a fixed manner to adjacent foil segments along at least one cutting edge, and joined in a reversible manner along at least one other cutting edge. These flap segments are used in the region of the driver-side door or the engine hood, for example. Zippers, VELCRO (hook-and-loop) fasteners or snap fastener strips are examples of reversible fasteners at the detachable cutting edges. That is to say, if one wanted to open, for instance, the engine hood of a motor vehicle covered by such a protective cover, the corresponding reversible closure extending along one cutting edge will be opened.

The flap segments used for movable add-on components such as the driver-side door, engine hood, trunk lid, etc. used in the protective cover described in European Published Patent Application No. 1 061 008 are permanently connected to the rest of the protective cover for the motor vehicle along at least one cutting edge, which means that they do not form a fully separate protective cover. In addition, to operate one of the movable add-on parts, for instance to open the driver-side door or the engine hood, the reversible closure will invariably have to be opened first in order to gain access to the engine compartment or to the passenger compartment of the vehicle. Since these reversible closures such as zippers are generally sewn to the corresponding foil segments, ripping of the seams in the region of the reversible closures occurs as a result of stressing. Moreover, repeated use often leads to jamming of the zippers, especially when portions of the protective cover get stuck in the zipper. It is also disadvantageous that dirt and water can enter when the flap segment is open.

SUMMARY

Example embodiments of the present invention provide a protective cover for motor vehicles, motor vehicle components, machines, etc., in which regions of components affixed on the object are accessible without manipulation of a reversible closure, effective protection for the movable component being provided at the same time.

According to example embodiments of the present invention, the protective cover for the movable component is a protective covering that is separate from the cover for the principal part of the object. No manipulation of a reversible closure is therefore required for gaining access to the engine compartment or to the interior of a motor vehicle, for instance. This also eliminates the aforementioned problems resulting from the use of such reversible closures. Dispensing with the reversible closures also leads to cost savings. The manipulation involved in, for instance, opening or closing engine hood covers, vehicle doors, etc., may be simplified and time saved. It is possible to reliably manipulate the components movably affixed on the object. For example, there is no longer a risk that parts of the protective cover get stuck in the region of a zipper, for instance. The protective covering for the movable part may envelop the movable component completely or virtually completely, i.e., in the case of an engine hood, its underside as well, or in the case of a vehicle door, the inside of the door. In contrast to conventional approaches, the entry of dirt or water into regions that are unprotected once a reversible closure has been opened may be prevented. A protective cover as described herein may be used both as transport protection and as installation protection, for example.

It may be provided to utilize such separate protective coverings for add-on components of the motor vehicle, for instance, for engine hoods, trunk lids, rear hatches, vehicle doors, etc. This allows them to be operated and thus to gain access to the vehicle regions they cover even if an object is covered by the protective cover, such access being possible at all times, in an uncomplicated, rapid manner and as often as necessary. Since the separate protective covering for the movable component may have no connection, i.e., neither a reversibly detachable connection nor a permanent connection, to the cover for the principal part of the object, the production of the protective cover may be simplified. Separate protective coverings for movable components may be smaller and thus easier to produce. Their size and form may be more easily adaptable to the corresponding movable components of different vehicle models. Work steps such as sewing them to other parts of the protective cover may be eliminated.

When mounted, the protective covering for the movable component may cover the predominant portion the surface of the movable part, i.e., in the closed state of the movable component, it covers the outside and, e.g., also at least parts of the inside of the movable component that become accessible via its opening.

Furthermore, it may be provided that the separate protective covering is able to be fixed in place on the movable component by at least one affixation element. At least one elastic band, for example, may be provided to affix the protective covering on the movable component. Other affixation elements such as hooks, cords, clips, eyes, etc., also may be used for mounting the protective covering on the movable part, it being possible to affix such parts on the movable component. As an alternative or in addition, the use of a VELCRO (hook-and-loop) closure, for example, may be provided in order to fix the protective covering in place on the movable component. Thus, it is possible to dispense with affixation elements on the movable component itself, such as hooks, eyes, etc., since the corresponding closure element of the VELCRO (hook-and-loop) closure may be provided on the protective cover itself in each case. The protective cover may be fixed in place on the movable component such that the component's motional function is not impaired. In the conventional approach, the motional function is always provided only when a reversible closure has been opened previously.

Moreover, a protective covering for a movable component of a motor vehicle, a machine, etc., may be provided which constitutes a separate protective covering for this movable component and is separate from the cover for the principal part of the object.

Example embodiments of the present invention are described in more detail below with reference to the appended Figures.

DETAILED DESCRIPTION

Figure 1:
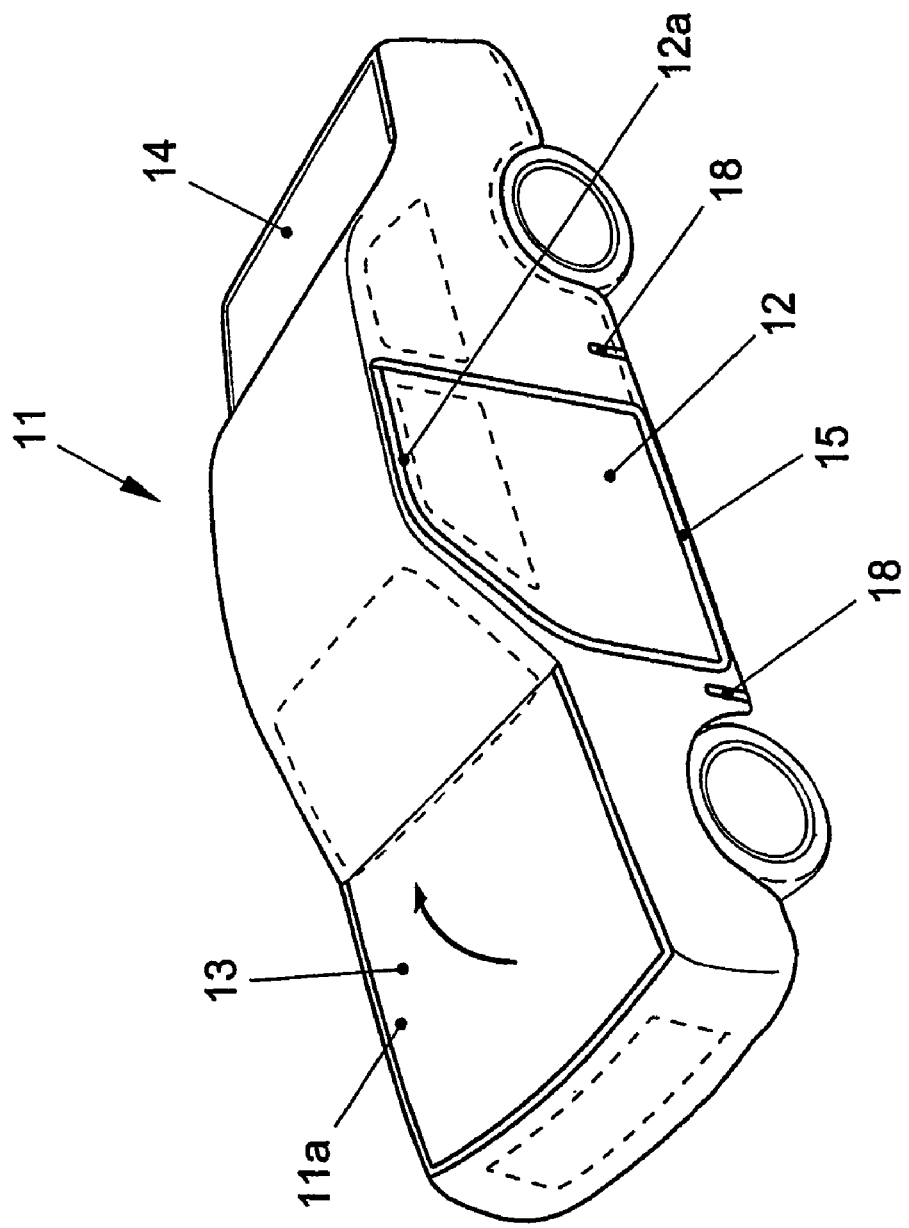
FIG. 1 is a perspective view of a motor vehicle having a protective cover.

First of all, reference is made to FIG. 1. FIG. 1 illustrates a protective cover 11, which is pulled over a motor vehicle. This protective cover may be made up of one part or also a plurality of parts. To fix protective cover 11 in place, suitable affixation elements such as tensioning straps engaging with closure elements 18 may be provided in the edge regions, such as in the region of the door sill of the motor vehicle. As an alternative or in addition, elastic bands, for instance, may be incorporated in end regions of the protective cover. Such a protective cover may be used for other purposes as well, for example, if components such as machines are to be transported across longer distances in a protected manner.

Protective cover 11 may be made of a material that, from the outside to the inside, is impermeable to water, dirt and oil, and, from the inside to the outside, is able to breathe, i.e., is designed, for example, to allow the passage of air, water vapor and possibly light. For instance, protective cover 11 may be made from a polymer-coated nonwoven fabric according to DIN 6001. Examples of polymers that may be considered are polypropylene, polyethylene, polyethersulfone (PES), polyamides and others as well. The nonwoven fabric also may be laminated to foils made from the aforementioned polymers. The composite material may be made of one or several layers of nonwoven fabric produced from drained synthetic and/or natural and/or semi-synthetic staple fibers. In the case of a nonwoven composite material made of a plurality of layers, a portion of this composite may be produced using spunbonded nonwoven technology. Needling, water jet technology or thermal methods, or a combination of such methods, may be used for bonding the nonwoven fabric. The weight of the protective cover may amount to, for example, between 30 and 180 g/m$^2$, and the thickness of the polymer coating or foil may be 15 to 200 μm. The material of the protective cover may be made of staple fiber nonwoven fabric made up of 70% PES/30% viscose, and may have a weight of 80 g/m$^2$, utilizing water jet technology for bonding. This material may be coated by 45 g/m$^2$ polypropylene/polyethylene.

The uncoated side of the material of the protective cover faces the enamel surface or the surface to be protected, and its structure and characteristic are selected such that damage to the surface by the force of wind, by friction, etc., may be prevented. This is the result in that the strength of the composite material of the protective cover is substantially provided by the polymer coating. Compared to other products, this may provide that the strength is provided first and foremost by the coating and not by the nonwoven fabric or tape fabric. This allows the "strength" requirement to be shifted from the textile, or the backing of the polymer coating/foil, to the polymer coating itself, so that the textile material facing the surface, in this case, the non-woven fabric, is able to be optimized in its "softness/scratch protection" characteristic.

Among others, the composite material offers protection from flying sparks, has sea and salt water resistance as well as UV-resistance for up to at least nine months. The material may have high "initial strength," which may provide for damping the first gust of wind which causes the flapping of the protective cover when vehicles provided with the protective cover are transported on the road or by rail. This, together with the soft inner side of the cover, may ensure a more careful transportation.

In the case of a motor vehicle covered by protective cover 11, in order to provide access in regions of movable add-on components of the motor vehicle such as vehicle doors 12, engine hood 13, or a trunk compartment lid or rear hatch 14, separate protective coverings are provided for these movable add-on components, for instance, a separate protective covering 11a for the engine hood, a separate protective covering 12a for the vehicle door, etc. These separate protective coverings for the movable add-on components are not joined to the other segments of protective cover 11. For the functioning of the movable add-on components, e.g., engine hood 13 or the vehicle door 12, there is no need to first open a reversible closure since separate protective covering 11a, 12a is able to be pulled over the corresponding movable component, such as engine hood 13 or vehicle door 12, separately, independently of the rest of protective cover 11. This aspect is described in greater detail in the following text with reference to FIG. 2.

Figure 2:
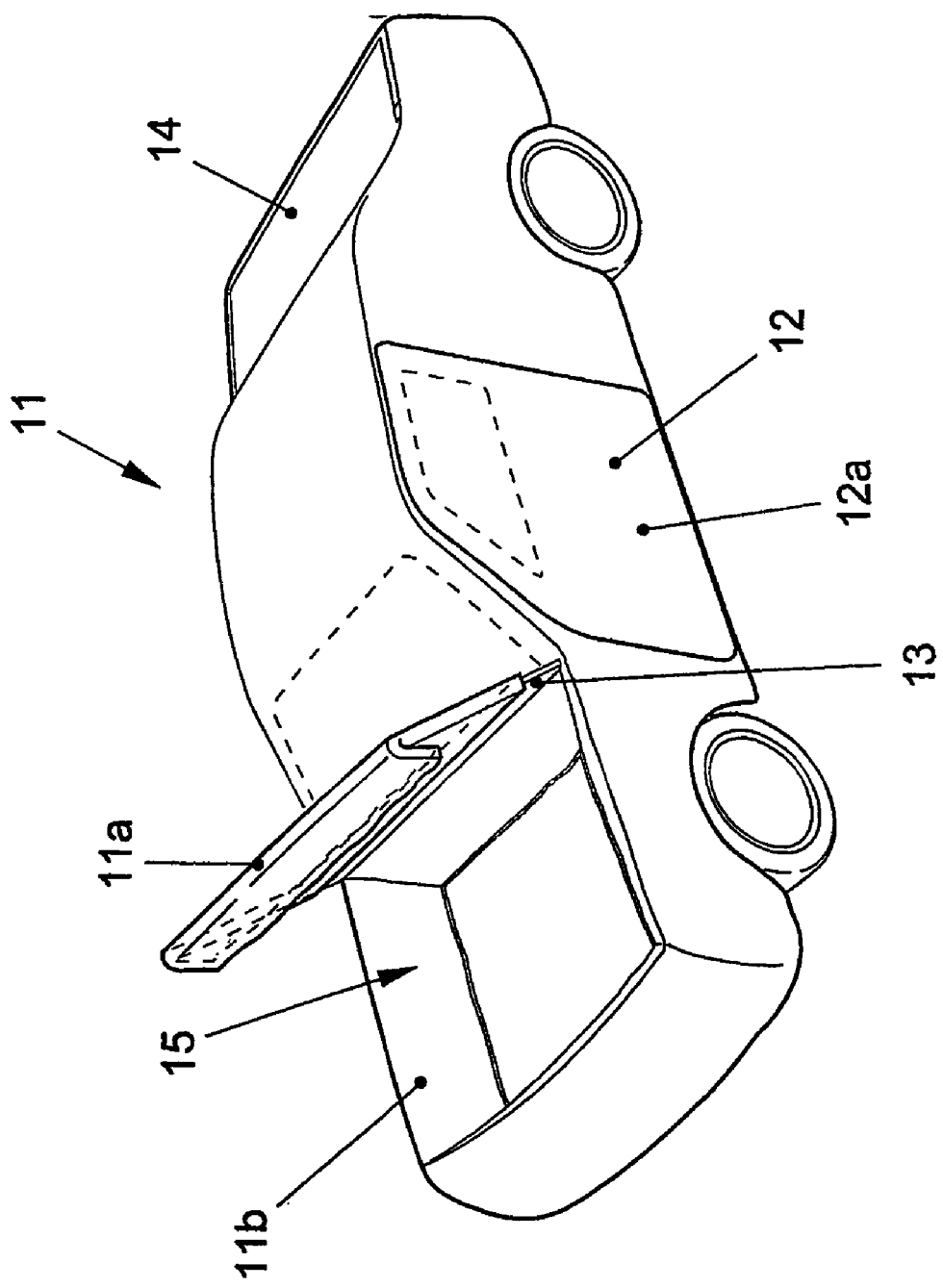
FIG. 2 is a corresponding perspective view of the motor vehicle with the engine hood open, while the protective covering for the engine hood is mounted.

FIG. 2 illustrates the vehicle illustrated in FIG. 1 with engine hood 13 raised. For better comprehension, separate protective covering 11a for engine hood 13 is pulled over engine hood 13 only partially. This separate protective covering 11a covers not only the top surface of the engine hood visible from the outside when the engine hood is closed, but it envelops the engine hood nearly in its entirety, i.e., including the front edge and the underside of the engine hood. This separate protective covering 11a therefore has the approximate form of a pocket, which is adapted to the outline of engine hood 13 and its spatial form. Only on one side is protective covering 11a provided with a slot-like opening, so that it may be slipped over the front edge of engine hood 13 and then pulled over the engine hood. This virtually complete enclosing of engine hood 13 which, once protective covering 11a is in place, is provided even when the engine hood is raised provides that soiling of the underside of the engine hood, for example, will be prevented as well. Regions 15 of the engine compartment located underneath the engine hood may be covered by foil segments 11b of protective cover 11 provided for the other regions of the vehicle, and are then protected from dirt or penetrating water when the engine hood is raised. This may not be the case if a one-piece protective cover were used, for instance, with zippers extending along the region of the front edge and the boundary edges on the sides, etc. The engine hood may be able to be opened as well once the zippers are undone. However, the regions of the engine compartment lying underneath the engine hood, as well as the underside of the engine hood, may not be covered by a protective cover in that case and therefore may be unprotected.

List of Reference Numerals 11 protective cover.
11a protective cover for engine hood
11b foil segment
12 vehicle door
12a protective covering for door
13 engine hood
14 rear hatch
15 regions of the engine compartment
18 closure element

What is claimed is:

1. A protective cover, comprising:
   a cover adapted to protect a principal part of an object; and
   at least one protective covering for at least one component movably affixed on the object, the protective covering for the movable component arranged as a protective covering that is entirely separate from the cover for the principal part of the object, the protective covering for the movable component adapted to cover a predominant portion of a surface of the movable part in a mounted state;
   wherein the separate protective covering for the movable component is adapted to cover surface areas of the movable part that lie on an inside and are not visible in a closed state; and
   wherein the separate protective covering for the movable component is not joined to the cover for the principal part of the object.

2. The protective cover according to claim 1, wherein the object includes at least one of (a) a motor vehicle, (b) a motor vehicle component and (c) a machine.

3. The protective cover according to claim 1, wherein segments of the cover are adapted to cover regions of an engine compartment lying underneath an engine hood.

4. The protective cover according to claim 1, wherein at least one separate protective covering is provided for an add-on component of a motor vehicle.

5. The protective cover according to claim 1, wherein at least one separate protective covering is provided for at least one of (a) an engine hood, (b) trunk lid, (c) a rear hatch and (d) door.

6. The protective cover according to claim 1, wherein the separate protective covering is fixable in place on the movable component by at least one affixation device.

7. The protective cover according to claim 6, wherein the affixation device includes at least one elastic band adapted to mount the protective covering on the movable component.

8. The protective cover according to claim 6, wherein at least one of (a) a hook, (b) a cord, (c) a clip and (d) an eye affixable on the movable component is adapted to mount the protective covering on the movable component.

9. The protective cover according to claim 1, wherein the protective covering includes at least one hook-and-loop closure adapted for affixation on the movable component.

10. The protective cover according to claim 1, wherein the protective covering is fixable in place on the movable component without impairing a motional function of the movable component.

11. A protective covering for a component movably affixed on an object, the protective covering for the movable component arranged as a protective covering that is entirely separate from a cover for a principal part of the object, the protective covering for the movable component adapted to cover a predominant portion of a surface of the movable part in a mounted state;
   wherein the separate protective covering for the movable component is adapted to cover surface areas of the movable part that lie on an inside and are not visible in a closed state; and
   wherein the separate protective covering for the movable component is not joined to the cover for the principal part of the object.

12. The protective covering according to claim 11, wherein the object includes at least one of (a) a motor vehicle and (b) a machine.

13. The protective cover according to claim 1, wherein at least one of (a) the cover for the principal part of the object and (b) the protective covering for the movable component is formed of a polymer-coated nonwoven fabric.

14. A protective cover, comprising:
   a cover adapted to protect a principal part of an object; and
   at least one protective covering for at least one component movably affixed on the object, the protective covering for the movable component arranged as a protective covering separate from the cover for the principal part of the object, the protective covering for the movable component adapted to cover a predominant portion of a surface of the movable part in a mounted state;
   wherein the separate protective covering for the movable component is adapted to cover surface areas of the movable part that lie on an inside and are not visible in a closed state;
   wherein at least one of (a) the cover for the principal part of the object and (b) the protective covering for the movable component is formed of a polymer-coated nonwoven fabric; and
   wherein a polymer coating of the polymer-coated nonwoven fabric includes at least one of (a) polypropylene, (b) polyethylene, (c) polyethersulfone, and (d) polyamides.

15. A protective cover, comprising:
   a cover adapted to protect a principal part of an object; and
   at least one protective covering for at least one component movably affixed on the object, the protective covering for the movable component arranged as a protective covering separate from the cover for the principal part of the object, the protective covering for the movable component adapted to cover a predominant portion of a surface of the movable part in a mounted state;
   wherein the separate protective covering for the movable component is adapted to cover surface areas of the movable part that lie on an inside and are not visible in a closed state;
   wherein at least one of (a) the cover for the principal part of the object and (b) the protective covering for the movable component is formed of a polymer-coated nonwoven fabric; and
   wherein the polymer-coated nonwoven fabric includes a lamination of a nonwoven fabric and a polymer foil.

16. The protective cover according to claim 13, wherein a weight of the protective cover is between 30 and 180 g/m$^2$.

17. The protective cover according to claim 13, wherein a thickness of a polymer coating of the polymer-coated nonwoven fabric is between 15 and 200 μm.

18. The protective covering according to claim 11, wherein the protective covering is formed of a polymer-coated nonwoven fabric.

19. A protective covering for a component movably affixed on an object, the protective covering for the movable component arranged as a protective covering separate from a cover for a principal part of the object, the protective covering for the movable component adapted to cover a predominant portion of a surface of the movable part in a mounted state;
   wherein the separate protective covering for the movable component is adapted to cover surface areas of the movable part that lie on an inside and are not visible in a closed state;
   wherein the protective covering is formed of a polymer-coated nonwoven fabric; and
   wherein a polymer coating of the polymer-coated nonwoven fabric includes at least one of (a) polypropylene, (b) polyethylene, (c) polyethersulfone, and (d) polyamides.

20. A protective covering for a component movably affixed on an object, the protective covering for the movable component arranged as a protective covering separate from a cover for a principal part of the object, the protective covering for the movable component adapted to cover a predominant portion of a surface of the movable part in a mounted state;

wherein the separate protective covering for the movable component is adapted to cover surface areas of the movable part that lie on an inside and are not visible in a closed state;

wherein the protective covering is formed of a polymer-coated nonwoven fabric; and wherein the polymer-coated nonwoven fabric includes a lamination of a nonwoven fabric and a polymer foil.

21. The protective covering according to claim 18, wherein a weight of the protective cover is between 30 and 180 g/m$^2$.

22. The protective covering according to claim 18, wherein a thickness of a polymer coating of the polymer-coated nonwoven fabric is between 15 and 200 µm.

23. A protective cover, comprising:

a cover adapted to protect a principal part of an object; and at least one protective covering for at least one component movably affixed on the object, the protective covering for the movable component arranged as a protective covering separate from the cover for the principal part of the object, the protective covering for the movable component adapted to cover a predominant portion of a surface of the movable part in a mounted state;

wherein at least one of (a) the cover for the principal part of the object and (b) the protective covering for the movable component is formed of a polymer-coated nonwoven fabric.

24. The protective cover according to claim 23, wherein the object includes at least one of (a) a motor vehicle, (b) a motor vehicle component and (c) a machine.

25. The protective cover according to claim 23, wherein segments of the cover are adapted to cover regions of an engine compartment lying underneath an engine hood.

26. The protective cover according to claim 23, wherein at least one separate protective covering is provided for an add-on component of a motor vehicle.

27. The protective cover according to claim 23, wherein at least one separate protective covering is provided for at least one of (a) an engine hood, (b) trunk lid, (c) a rear hatch and (d) door.

28. The protective cover according to claim 23, wherein the separate protective covering for the movable component is not connected to the cover for the principal part of the object.

29. The protective cover according to claim 23, wherein the separate protective covering for the movable component is adapted to cover surface areas of the movable part that lie on an inside and are not visible in a closed state.

30. The protective cover according to claim 23, wherein the separate protective covering is fixable in place on the movable component by at least one affixation device.

31. The protective cover according to claim 30, wherein the affixation device includes at least one elastic band adapted to mount the protective covering on the movable component.

32. The protective cover according to claim 30, wherein at least one of (a) a hook, (b) a cord, (c) a clip and (d) an eye affixable on the movable component is adapted to mount the protective covering on the movable component.

33. The protective cover according to claim 23, wherein the protective covering includes at least one hook-and-loop closure adapted for affixation on the movable component.

34. The protective cover according to claim 23, wherein the protective covering is fixable in place on the movable component without impairing a motional function of the movable component.

35. The protective cover according to claim 23, wherein a polymer coating of the polymer-coated nonwoven fabric includes at least one of (a) polypropylene, (b) polyethylene, (c) polyethersulfone, and (d) polyamides.

36. The protective cover according to claim 23, wherein the polymer-coated nonwoven fabric includes a lamination of a nonwoven fabric and a polymer foil.

37. The protective cover according to claim 23, wherein a weight of the protective cover is between 30 and 180 g/m$^2$.

38. The protective cover according to claim 23, wherein a thickness of a polymer coating of the polymer-coated nonwoven fabric is between 15 and 200 µm.

39. A protective covering for a component movably affixed on an object, the protective covering for the movable component arranged as a protective covering separate from a cover for a principal part of the object, the protective covering for the movable component adapted to cover a predominant portion of a surface of the movable part in a mounted state;

wherein the protective covering is formed of a polymer-coated nonwoven fabric.

40. The protective covering according to claim 39, wherein the object includes at least one of (a) a motor vehicle and (b) a machine.

41. The protective covering according to claim 39, wherein a polymer coating of the polymer-coated nonwoven fabric includes at least one of (a) polypropylene, (b) polyethylene, (c) polyethersulfone, and (d) polyamides.

42. The protective covering according to claim 39, wherein the polymer-coated nonwoven fabric includes a lamination of a nonwoven fabric and a polymer foil.

43. The protective covering according to claim 39, wherein a weight of the protective cover is between 30 and 180 g/m$^2$.

44. The protective covering according to claim 39, wherein a thickness of a polymer coating of the polymer-coated nonwoven fabric is between 15 and 200 µm.

45. The protective covering according to claim 39, wherein the separate protective covering for the movable component is adapted to cover surface areas of the movable part that lie on an inside and are not visible in a closed state.

* * * * *